United States Patent
Samii et al.

(10) Patent No.: US 10,037,016 B2
(45) Date of Patent: Jul. 31, 2018

(54) HYBRID DUAL-DUPLEX FAIL-OPERATIONAL PATTERN AND GENERALIZATION TO ARBITRARY NUMBER OF FAILURES

(71) Applicant: GM GLOBAL TECHNOLOGY OPERATIONS LLC, Detroit, MI (US)

(72) Inventors: Soheil Samii, Royal Oak, MI (US); Markus Jochim, Troy, MI (US); Thomas E. Fuhrman, Shelby Township, MI (US); Massimo Osella, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 232 days.

(21) Appl. No.: 15/078,248

(22) Filed: Mar. 23, 2016

(65) Prior Publication Data

US 2017/0277153 A1    Sep. 28, 2017

(51) Int. Cl.
*G05B 19/042* (2006.01)
*G05B 9/03* (2006.01)

(52) U.S. Cl.
CPC .......... *G05B 19/0425* (2013.01); *G05B 9/03* (2013.01); *G05B 2219/24033* (2013.01); *G05B 2219/25022* (2013.01)

(58) Field of Classification Search
CPC ...... G05B 19/0425; G05B 2219/24033; G05B 2219/25022; G05B 9/03

(Continued)

(56) References Cited

U.S. PATENT DOCUMENTS 3,874,743 A * 4/1975 Fleischer ................ B60T 8/885
                                                303/122.05
4,656,588 A * 4/1987 Kubo .................. B60T 8/17616
                                                303/122.11

(Continued)

OTHER PUBLICATIONS

Fuhrman et al., "Diagnosis in Automotive Systems: A Survey", 2013, General Motors Research, Parallel Data Laboratory, Carnegie Mellon University, CMU-PDL-110, pp. 1-22. (Year: 2011).*

(Continued)

*Primary Examiner* — Chun Cao
(74) *Attorney, Agent, or Firm* — Quinn IP Law (57) ABSTRACT

A modified dual-duplex fail-operational control system. A primary controller includes a first processing unit and a second processing unit for executing a function. A first comparative module comparing the function results from the first and second processing unit to determine an error the first controller. A second controller includes a first processing unit and second processing unit. The first processing unit executes the function. The second processing unit operating in a non-redundant state and not executing the function while in the non-redundant state. A second comparative module determines whether an error is present in the second controller. A matching function result identified by the first comparative module of the first controller is input to second comparative module of the second controller to determine whether an error is present in the second controller utilizing only the matching function result identified by the first comparative module and the function result determined by the first processing unit of the second controller.

20 Claims, 5 Drawing Sheets (58) Field of Classification Search
USPC .................. 714/6.3, 11, 37, 47.1; 700/3, 20
See application file for complete search history.

(56) References Cited

U.S. PATENT DOCUMENTS

| | | | |
|---|---|---|---|
| 5,136,704 A * | 8/1992 | Danielsen ........... | G06F 11/1641 714/11 |
| 6,356,813 B1 * | 3/2002 | Sommer ............ | G05B 19/0421 701/1 |
| 2012/0101791 A1 * | 4/2012 | Komatsu ............... | G05B 17/02 703/6 |

OTHER PUBLICATIONS

Jochim et al., "Towards Dependable Autonomous Driveing Vehicles: A System-Level Approach", 2013, SIGBED Review, pp. 29-32.*

* cited by examiner

HYBRID DUAL-DUPLEX FAIL-OPERATIONAL PATTERN AND GENERALIZATION TO ARBITRARY NUMBER OF FAILURES

BACKGROUND OF INVENTION

An embodiment relates to fault tolerant control systems.

Systems which provide safety functions typically utilize redundant controllers to ensure safety by shutting down functions that have experienced a fault or failure. If a fault is detected, the controller is shut down or the controller fails silently where no signals are generated by the controller and a secondary controller is reconfigured to become the primary controller.

Some systems try to implement control systems utilizing a fail-operational system where additional controllers are used to ensure that a safe operation can be continued for a duration of time, such as dual duplex controllers. If a first controller fails and fails silently, depending on the system design, a second controller may be active all the time and may need to be activated. If this is performed, all actuators will switch over to rely on requests from the second controller. Unlike software faults where a fault in one controller would be present in the duplicate controller, hardware faults (e.g., power supply faults, short to ground faults, etc), although not to a level of criticality of software faults since software design faults would affect both controllers the same, will typically fail independently, and the secondary controller while not typically having the same defect can properly operate thereafter.

Typically, a controller includes either two processors or two cores where functions are executed independently and simultaneously on a respective controller. As a result, both the primary controller and the secondary controller will have a same function executed by two processors or two cores within each controller. As a result, if a dual-duplex design is utilized, then a same function will be executed independently four times. The results from each controller are compared for determining whether an error is present in one of the controllers. While the dual-duplex design offers additional robustness, redundancy operation require additional resources (e.g., processors, cores) since each function is executed independently twice in each controller. Redundancy operations require using parallel execution of multiple copies requires additional hardware resources so that consequently there is a cost impact for providing these hardware resources.

SUMMARY OF INVENTION

An advantage of an embodiment is a reduction in the processing time of controllers such that processing resources can be freed up for other operations and lessen an overall processing burden of the processor. By leveraging the results and data integrity of a prior controller for error detection and realization of fail-silence properties, only one execution of the function is required in a succeeding controller. As a result, processing is reduced by not having to execute two functions for every controller. A control system with two controllers can achieve 25% reduction in processing, whereas a control system with three controllers can achieve a 33% reduction during normal operating conditions (i.e., absence of a fault). The savings in processing can be determined by the following formula: $N/(2+2N)$ where N is the number of failures the control system is to handle.

An embodiment contemplates a modified dual-duplex fail-operational control system. A primary controller controls features of devices while operating under non-fault operating conditions. The primary controller comprises a first processing unit executing a function utilizing input data from sensing devices, and a second processing unit simultaneously executing the function utilizing the input data from sensing devices. A first comparative module compares the function result from the first processing unit with the function result from the second processing unit to determine whether an error is present in the first controller. A second controller comprises a first processing unit executing the function utilizing the input data from sensing devices, and a second processing unit operating in a non-redundant state. The second processing unit not executing the function while in the non-redundant state. A second comparative module determines whether an error is present in the second controller. A matching function result identified by the first comparative module of the first controller is input to second comparative module of the second controller. The second comparative module determines whether an error is present in the second controller utilizing only the matching function result identified by the first comparative module and the function result determined by the first processing unit of the second controller.

DETAILED DESCRIPTION

The following detailed description is meant to be illustrative in understanding the subject matter of the embodiments and is not intended to limit the embodiments of the subject matter or the application and the uses of such embodiments. Any use of the word "exemplary" is intended to be interpreted as "serving as an example, instance, or illustration." Implementations set forth herein are exemplary are not meant to be construed as preferred or advantageous over other implementations. The descriptions herein are not meant to be bound by any expressed or implied theory presented in the preceding background, detailed description or descriptions, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, (e.g., memory elements, digital signal processing elements, logic elements, look-up tables, or the like, which may carry out a variety of functions under the control of one or more microprocessors or other control devices).

When implemented in software, various elements of the systems described herein are essentially the code segments or computer-executable instructions that perform the various tasks. In certain embodiments, the program or code segments are stored in a tangible processor-readable medium, which may include any medium that can store or transfer information. Examples of a non-transitory and processor-readable medium include an electronic circuit, a microcontroller, an application-specific integrated circuit (ASIC), a semiconductor memory device, a ROM, a flash memory, an erasable ROM (EROM), a floppy diskette, a CD-ROM, an optical disk, a hard disk, or the like.

The system and methodology described herein can be utilized to identify faults in controllers executing software functions in control systems. While the approach and methodology are described below with respect to controllers used in vehicle applications, one of ordinary skill in the art appreciates that an automotive application is merely exemplary, and that the concepts disclosed herein may also be applied to any other suitable communications system such as, for example, general industrial automation applications, manufacturing and assembly applications, avionics, aerospace, and gaming.

The term "vehicle" as described herein can be construed broadly to include not only a passenger automobile, but any other vehicle including, but not limited to, rail systems, planes, off-road sport vehicles, robotic vehicles, motorcycles, trucks, sports utility vehicles (SUVs), recreational vehicles (RVs), marine vessels, aircraft, farming vehicles, and construction vehicles.

Figure 1:
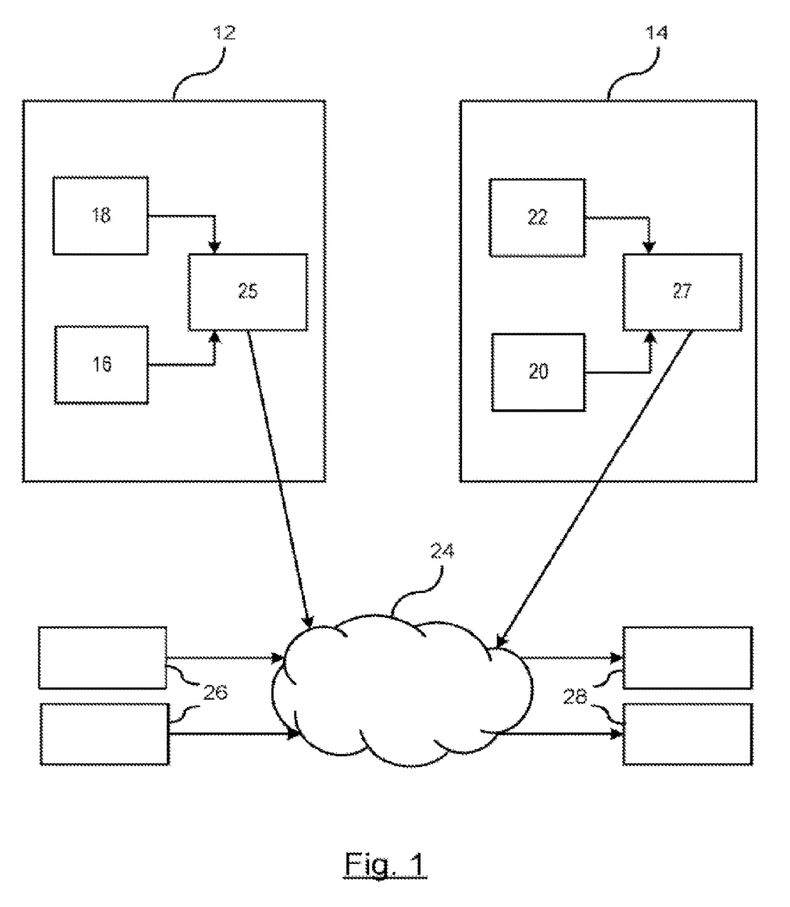
FIG. 1 is an architectural block diagram of an exemplary integrated control system.

There is shown in FIG. 1 an architectural block diagram of an exemplary integrated control system. Such control systems will often utilize two controllers so that if a hardware error occurs with a primary controller, then a backup controller may be readily enabled to control a feature of the control system or provide control for limited functionality of the feature in error.

In FIG. 1, a traditional dual-duplex system shown to include a primary controller 12 and a backup controller 14 (hereinafter referred to as a secondary controller). The exemplary system as described herein is vehicle based, but as described earlier, the architecture can apply to non-vehicular systems. The primary controller 12 includes two processing units that include a first processing unit 16 and a second processing unit 18 for executing primary controls. The secondary controller 14 includes a two processing units that include a first processing unit 20 and a second processing unit 22. It should be understood that term processing unit may include independent processors or independent cores. Alternatively, if desired, the processor unit may include a dual-core processor having two cores on a same chip. For illustrative purposes herein, the primary controller 12 and secondary controller 14 are identical with same hardware and same software. However, certain devices in the architecture may utilize different devices such as different power supplies so that if an error occurs with a controller as a result of a power supply, it does not affect the other controller. The primary controller 12 is designated as the master active controller and receives input signals and executes functions based on the input signals and outputs control signals to the other devices over a communication network 24 when in an operational and non-failed state. The primary controller 12 operates under non-failure operating conditions (herein referred to as normal operating conditions) and will generate and transmit control signals for controlling features of a vehicle device.

The secondary controller 14 receives data and executes functions using secondary controls which are identical to the primary controls, but output control signals are not utilized by the devices on the communication network when the primary controller 12 operates under normal operating conditions.

The primary controller 12 and the secondary controller 14 communicate via the communication network 24. It should be understood that the communication network may include, but is not limited to, communication area network (CAN), CAN-FD, FlexRay, switched networking with Ethernet, wireless communication, or multiple networks using gates. The requirement is that each of the controllers and sensors/actuators can communication with one another. The primary controller 12 and the secondary controller 14 utilize the communication network 24 to receive and transmit data between sensors 26 and actuators 28.

Sensors 26 sense for a respective condition and transmit input signals to the controllers relating to the respective condition. Upon the primary controller 12 receiving the input signals from the sensors 26, each processing unit 16 and 18 of the primary controller 12 simultaneously executes a software function utilizing input data. The primary controller 12 outputs a control signal based on the executed function to the actuators 28. The term actuator may include, but is not limited to, receivers and other devices receiving control signals from the controllers. The actuators 28 include devices for actuating a feature of the vehicle system. Typically, features are those that are either critical or are required by the vehicle to maintain at least some safe operation of the vehicle. Such control devices may include, but are not limited to braking controls, steering controls, and propulsion controls. Under a fail-operation condition, functionality to critical devices, although limited, is enabled to allow the driver to safely operate the vehicle until the vehicle can be driven to a location for inspection, to maintain operation until the operator can take over controls and perform a function manually, or maintain operation for a short duration of time until the vehicle can be brought to a stop safely.

During the time the primary controller 12 is executing functions based on the input data, the secondary controller 14 is mirroring the primary controller 12 and is simultaneously executing the same functions based on the same data. This is known as redundancy. The secondary controller 14 mirrors the primary controller 12 by executing functions in a same state as the primary controller 12. This is performed in the event that an error occurs in the primary controller 12, the secondary controller 14 must be ready to immediately take over the operations of the primarily controller 12. To take over immediately, the secondary controller 14 must be in the same state as primary controller 12. That is, the two controllers implement and execute identical functionality to tolerate one controller failure, and that safety critical software is executed redundantly within each controller to detect errors (i.e., error detected that are internal to the controller) and switch off any communication from primary controller should the primary controller fail (i.e., fail-silent), or to detect errors in the secondary controller which can result in latent faults.

The primary controller 12 includes a comparative module 25 and the secondary controller 14 includes a comparative module 27 for performing a comparative check between the outputs results of respective processing units of a respective controller. Each respective comparative module performs a comparative operation to determine whether the results of each executed function from each processing unit within the respective controller match since each processing unit executes a same function utilizing the same input data. If the processing units are operating without error, then the results should match. If the results differ, then an error may be present in that respective controller. As a result, each comparative module requires two inputs comparing the executed functional results for determining whether an error occurred in their respective controller. The results are transmitted on the communication network 24 to other devices such as other controllers and actuators on the communication network 24. Both controllers may include a diagnostic function for monitoring error conditions in the other controllers based on observing the messages the other controller sends on the network for reconfiguring the controllers should there be a failure.

This traditional dual-duplex design that utilizes redundancy execution of critical software in fail-operational system consumes system resources and has increased costs due to expensive computational resources that it demands. The dual-duplex pattern as illustrated herein can handle at most one controller failure and does not scale well with increasing requirements on the number of controllers failures that need to be tolerated in the same drive cycle which would require increased hardware (i.e., redundancy) resulting in increased cost. In addition, resources that are being used be either left idle or may be used to execute other functions which can make efficient use of existing hardware.

Figure 2:
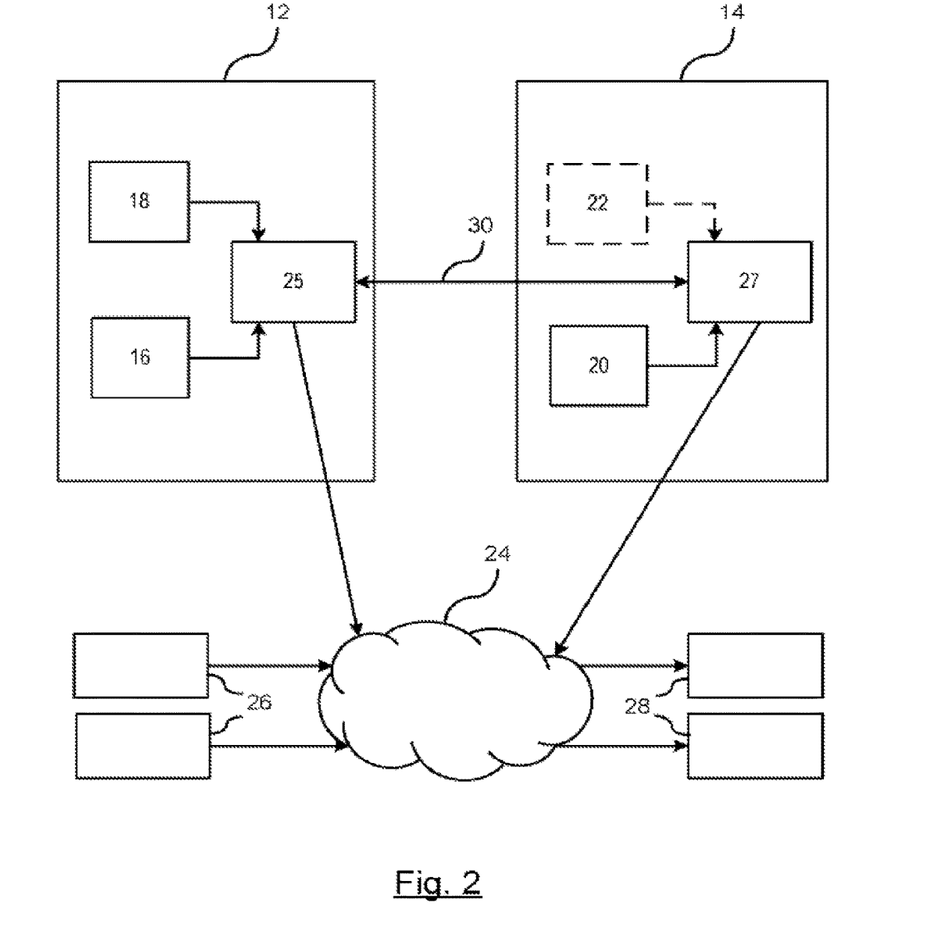
FIG. 2 is a first embodiment of a modified duplex architecture for performing redundancy checks.

FIG. 2 illustrates a first embodiment of a modified duplex architecture for performing redundancy checks. The hardware architecture is similar to that shown in FIG. 1 and similar element numbers will be utilized. The primary controller 12 includes the first processing unit 16 and the second processing unit 18, and the secondary controller 14 includes the first processing unit 20 and the second processing unit 22. The first processing unit 16 and the second processing unit 18 execute the function and the function results from each processing unit are input to the comparative module 25 for determining whether the function results executed by each processing unit match. If the function results from each processing unit match, then the determination is made that the primary controller 12 is operating under normal operating condition. It should be understood that the term "match" may include an exact match or a substantially close match. An exact match is defined as the comparative results being identical. A substantially close match is defined as the comparative results, while not identical, are close enough such that a maximum deviation is allowed between the comparative results.

The secondary controller 14, under this technique, does not operate under the same conditions as the primary controller 12. As shown in FIG. 2, only the first processing unit 20 in the secondary controller 14 is utilized for executing the function. The second processing unit 22 is in a non-redundant state. The term non-redundant state is defined as the processing unit is either idle or is executing some function other than that which is being executed by the function executed by the first processing unit. As a result, the function is not executed by the second processing unit 22 of the secondary controller 14, and therefore, no input is provided by the second processing unit 22 to the comparative module 27. As set forth herein, the second processing unit 22 of the secondary controller 14 when not being used can be used for other tasks, or alternatively, may not even be present as part of the system. To perform a redundancy check in the comparative module 27 of the secondary controller 14, two functional results are required for comparison. Since the second processing unit 22 in the secondary controller 14 is not active, a second function result must be supplemented in lieu of the functional result typically generated by the second processing unit 22. To provide a second input to the comparative module 27, a communication link 30 is coupled between the comparative module 25 of the primary controller 12 and the comparative module 27 of the secondary controller 14. It should be understood that the communication link 30 as is shown for illustrative purposes as a communication channel between controllers. For each of the embodiments described herein, each of the respective controllers are directly in communication with one another the communication network 24 or individual communication networks for allowing respective controllers to communicate with directly with one another. As a result, each controller can communicate a respective functional result directly with any other controller within the control system using the communication network as shown or other communication networks. The communication link 30 may include, but is not limited to, a switch, a broadcast bus, wireless (e.g., WiFi, Bluetooth) or multiple individual networks such as a bridged local area network. Alternatively, the communication link 30 can be implemented as a dedicated communication channel that directly couples the primary controller 12 and the secondary controller 14 for communication; however, a preferred method of communication is the communication network since communications between controllers are already established in the control system via the network and it is the custom mode of communication between controllers. Recall that a functional result by the first processing unit 16 of the primary controller 12 is compared with a function result by the second processing unit 18 of the secondary controller 14. If the function results match one another, then the matching function result is identified and is utilized as the second input to the comparative module 27. Therefore, the term matching function result will be used herein as the function result from a respective preceding controller where both function results inputs to the preceding comparative module match one another. As a result, the matching function result is used as an input to a succeeding controller.

Referring again to FIG. 2, the matching function result from the comparative module 25 of the primary controller 12 is input to the comparative module 27 of the secondary controller 14. The matching function result as determined by the comparative module 25 of the first controller not only provides function results that are checked, but data integrity is also determined by the comparative module 25. In the secondary controller 14, the comparative module 27 compares the functional result generated by the first processing unit 20 and the matching functional result supplied by the comparative module 25 of the primary controller 12 for determining whether an error is present based on whether the respective inputs to the second comparative module 27 match one another. In instances where a result is not sent from the comparative module 25 due to a controller issue or communication issue (e.g., controller 12 fails), then a determination is made whether the respective inputs to the second comparative module 27 are available and/or a match is present. For example, the result of the first processing unit 20 can be used as the output of comparative module 27 since a maximum number of failures have occurred, and therefore, a second computation is not needed. It should be recalled that each of the processing units execute the same software function utilizing the same sensor data, and if no error is present in a respective controller, then the functional results executed by each processing unit should match. The matching function result determined by a respective comparative module is basically the function result inputs to that respective comparative module since the results should be substantially similar if a match is present. By leveraging the matching functional result of the primary controller 12 as a second input to the comparative module 27 of the secondary controller 14, execution by the second processing unit 22 of the secondary controller 14 is not required. As a result, utilization of system resources is reduced, and a 25% reduction in processing is achieved compared to the traditional dual-duplex approach.

Figure 3:
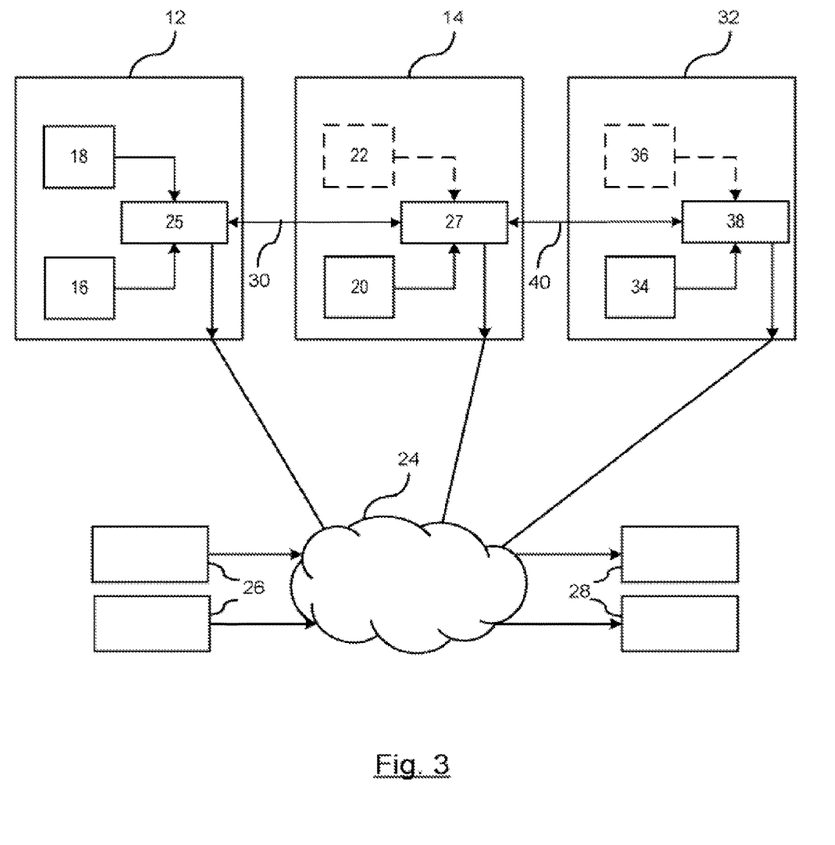
FIG. 3 is a second embodiment of a modified duplex architecture for performing redundancy checks.

FIG. 3 illustrates a second embodiment of a modified duplex architecture for performing redundancy checks. The following architecture provides a generalization of three controllers used to tolerate up to two controller failures. The primary controller 12, secondary controller 14, and a backup controller 32 (hereinafter referred to as the third controller) are utilized in the control system. The third controller 32 includes identical architecture as the other controllers. The third controller 32 includes a first processing unit 34, a second processing unit 36, in a comparative module 38. A communication link 40 couples the comparative module 27 of the secondary controller 14 and the comparative module 38 of the third controller 32. As set forth earlier, the communication link 30 and 40 are preferably part of the communication network 24 or individual communication networks and are shown for illustrative purposes. The respective processing units and comparative module 38 in the third controller 32 function identical to the respective processing units and comparative module in the secondary controller 14 where only the first processing unit 34 executes the function in the third controller 32 whereas the second processing unit 36 is in a non-redundant state and may be used for other tasks. In the third controller 32, the matching function result obtained from the comparative module 27 of the secondary controller 14 is provided to the comparative module 38 and the third controller 32. The function result determined by the first processing unit 34 of the third controller 32 is compared to the matching function result obtained from the comparative module 27 of the secondary controller 14 for determining whether a match is present. If a match is present, the determination is made that the third controller 32 is functioning under normal operating conditions. If the respective results do not match, then a determination is made that an error is present in the third controller 32. Similar to the configuration in FIG. 2, a reduction in processing is achieved by not utilizing respective processing units in each of the secondary controller 14 and the third controller 32. That is, for a traditional dual-duplex approach, all six processing units would be utilized if three controllers were utilized. In utilizing the modified dual-duplex approach, only four processing units are utilized out of the six possible processing units. As a result, a 33% reduction in processing is obtained in comparison to the traditional dual-duplex approach.

Utilizing the technique described herein, to handle N-number of failures requires N+1 controllers where N is the number of failures the control system is designed to handle. In the traditional dual-duplex approach 2+2N executions must be performed, whereas the modified dual-duplex approach only requires 2+N executions. The reduction in processing can be generalized as N/(2+2N) where N is the maximum number of failures that are required to be handled.

As described earlier, each of the respective controllers may be connected to one another through the communication network 24 or individual communication networks. As a result, more communication channels are utilized than are actually shown in the figure such that each controller is directly in communication with all other controllers should an intermediate backup controller fail. Therefore, if for example, the secondary controller 14 fails or a non-matching result is identified in the secondary controller 14, the communication network 24 or individual communication networks provides direct communications between the primary controller 12 and the third controller 32. In such an instance for example, the results of the comparative module 25 will be directly communicated to the comparative module 38 of the third controller 32 and used as an input via a respective communication network. In addition, another technique of communicating results may include each controller sending its computation result on the communication network so that each of the other controllers have at least one computation to use when the local controller is performing its local computation with results from its first processing unit.

The system includes an algorithm for reconfiguring controllers as either primary controllers or backup controllers. That is, if a determination is made that the failure incurred in one of the controllers, a predetermined order is identified as to which controller will be designated either a primary controller or the designated backup controller. For example, if the primary controller that is active fails, an algorithm is executed that identifies which alternative non-fail controller is reconfigured to function as the primary controller. Similarly, if the determination is made that secondary controller 14 as shown in FIG. 2 has failed, the algorithm identifies which respective controller is configured as the backup controller to the primary controller if a plurality of controllers are utilized.

Should a failure occur where all but one of the three controllers fail, then the non-failed controller will be reconfigured as the primary controller and no backup controllers will be utilized. In this scenario, since a maximum number of failures being tolerated has been reached, then the matching function does not need to be utilized so execution this function on both cores is not required.

Figure 4:
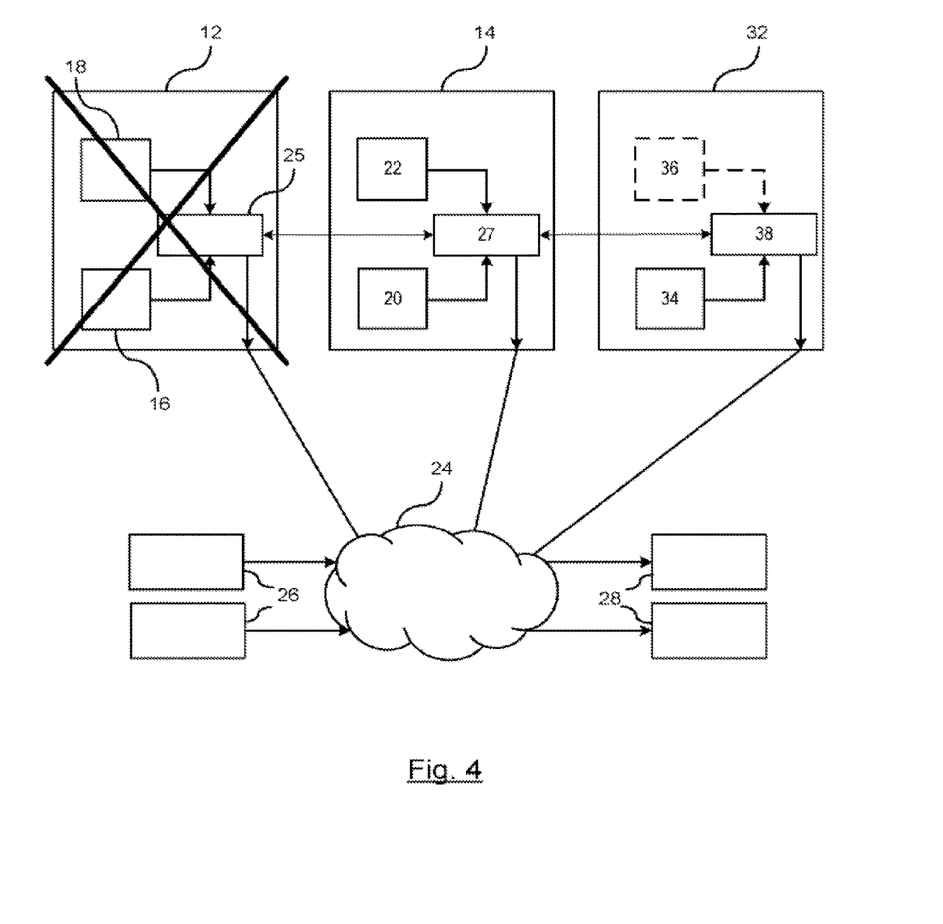
FIG. 4 illustrates an example of a failed primary controller and a reconfiguration of a backup controller.

FIG. 4 illustrates an example of a failed primary controller and a reconfiguration of a backup controller. In FIG. 4, a determination is made by the comparative module 25 that an error is present in the primary controller 12 as a result of the function results of the first processing unit 16 and second processing unit 18 not matching. The primary controller 12 fails silently and no signal is output from the primary controller 12, and therefore, this is how the other controllers determine that the primary controller has failed due to an absence of a signal or communication. In other instances, communication is sent out to other controllers and devices on the communication network 24 that a failure has occurred in the primary controller 12 and that the primary controller 12 should fail-silent. As a result, no other controllers will communicate or listen to signals from the primary controller 12. Furthermore, the control system described herein executes on each operational controller, an algorithm for determining which backup controller should be reconfigured as next primary controller. As shown in FIG. 4, the secondary controller 14 is reconfigured as the primary controller. Therefore, the first processing unit 20 and the second processing unit 22 are operational for obtaining data from sensors and executing functions. In FIG. 4, the function results from each respective processing unit are provided to the comparative module 27. The previously relied on function result from the comparative module 25 is no longer relied upon, and therefore, communications from the previous primary controller 12 are fail-silent. The reconfigured controller 14 now functions as the primary controller, and therefore, utilizes both function results from both processing units in the secondary controller 14. The third controller 32 will continue functioning as a backup controller where only the first processing unit 34 is used to execute functions. The matching function result from the comparative module 27 of the reconfigured controller 14 now designated as the primary controller are transmitted to the comparative module 38 of the third controller 32 for comparison with the function results determined by the first processing unit 34. It should be understood that more controllers may be utilized than described herein and that this technique can be applied to as many controllers as the control system utilizes where the failed primary controller fails in a fail-silent mode and a designated backup controller is reconfigured as the primary controller and both processing units therein are utilized for executing functions. All other controllers resume typical operations where only one processing unit is used for executing functions and the matching function result from another secondary controller are used as input to the comparative module. This is done to detect errors in backup controllers so as to avoid latent errors in the system. Should a failure occur where all but one of the three controllers fail, then the non-failed controller will be reconfigured as the primary controller and no backup controllers will be utilized. In this scenario, since a maximum number of failures being tolerated has been reached, then the matching function does not need to be utilized so execution this function on both cores is not required.

Figure 5:
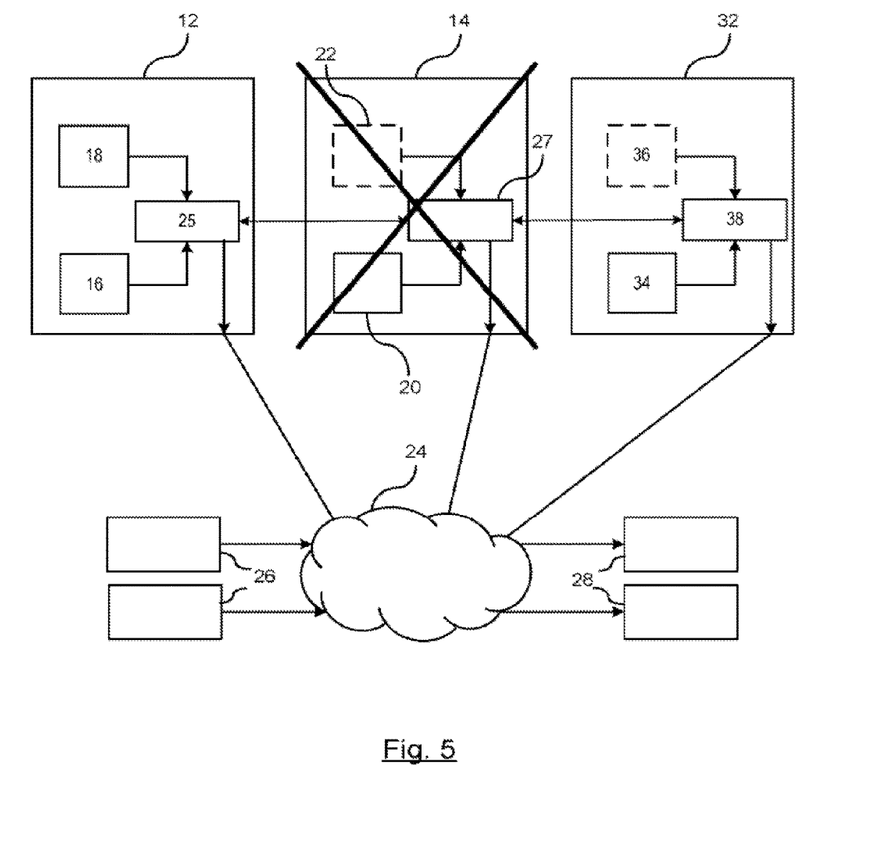
FIG. 5 illustrates an example of a failed secondary controller and a reconfiguration of a backup controller.

FIG. 5 illustrates an example of a failed backup controller. Utilizing the same element numbers, the primary controller 12 operates in a non-failed state. The secondary (backup) controller 14 fails. The failed backup controller 14 will fail-silent. Communications from the failed backup controller 14 will not be available and will virtually be removed from the control system. As described earlier, each of the controllers are in direct communication with one another over the communication network 24 or through separate communication networks. As a result, the primary controller 12 is in direct communication with the third controller 32 for directly transmitting comparative results. The third controller 32 will use the result of the inputs from comparative module 25 and the first processing unit 34 for error detection. This is done in order for the third controller 32 to be able to detect errors in its own computation and fail silently under this failed condition for which the secondary controller 14 has failed and the computation form comparative module 27 is no longer available. Should a failure occur where two of the three controllers fail, then the non-failed controller will be reconfigured as the primary controller and no backup controllers will be utilized. In this scenario, since a maximum number of failures being tolerated has been reached, then the matching function does not need to be utilized so execution this function on both cores is not required.

While certain embodiments of the present invention have been described in detail, those familiar with the art to which this invention relates will recognize various alternative designs and embodiments for practicing the invention as defined by the following claims.

What is claimed is:

1. A dual-duplex fail-operational control system comprising:
 a primary controller controlling features of devices while operating under non-fault operating conditions, the primary controller comprising:
  a first processing unit executing a function utilizing an input data from sensing devices to generate a function result;
  a second processing unit simultaneously executing the function utilizing the input data from sensing devices to generate a function result;
  a first comparative module comparing the function result from the first processing unit with the function result from the second processing unit to determine whether an error is present in the primary controller, wherein the first comparative module generates a matching function result when the function result from the first processing unit substantially matches the function result from the second processing unit;
 a second controller comprising:
  a first processing unit executing the function utilizing the input data from sensing devices to generate a function result;
  a second processing unit operating in a non-redundant state, the second processing unit not executing the function while in the non-redundant state;
  a second comparative module determining whether an error is present in the second controller;
 wherein the matching function result identified by the first comparative module of the primary controller is input to the second comparative module of the second controller, wherein the second comparative module determines whether an error is present in the second controller utilizing only the matching function result identified by the first comparative module and the function result determined by the first processing unit of the second controller; and
 designating the second controller as a reconfigured primary controller to control the features of the devices when an error is detected in the primary controller, wherein the first processing unit and the second processing unit of the second controller are each enabled to respectively execute the function utilizing the input data from the sensing devices to generate a respective function result so that the second comparative module may compare the respective function results to determine whether an error is present in the second controller.

2. The control system of claim 1 further comprising a communication link coupled between the first comparative module and the second comparative module, wherein the matching function result determined by the first comparative module is communicated from the first comparative module to the second comparative module via the communication link.

3. The control system of claim 1 further comprising:
 at least a third controller including:
  a first processing unit executing a function utilizing the input data from sensing devices to generate a function result;
  a second processing unit operating in a non-redundant state, the second processing unit not executing the function while in the non-redundant state;
  a third comparative module determining whether an error is present in the at least third controller;
 wherein a matching function result identified by a respective comparative module of one of the preceding controllers is input to the third comparative module of the at least third controller, wherein the third comparative module determines whether an error is present in the at least third controller utilizing only the matching function result identified by the respective comparative module of one of the preceding controllers and the function result determined by the first processing unit of the at least third controller.

4. The control system of claim 3 wherein an error detected in the primary controller results in the primary controller failing fail-silent, and wherein the second controller is designated as a reconfigured primary controller, wherein the first processing unit and the second processing unit of the second controller are active to execute the function to determine whether the error is present in the second controller via the second comparative module.

5. The control system of claim 4 wherein the second comparative module determines whether an error is present the second controller designated as the reconfigured primary controller based on the function results from the first processing unit and the second processing unit of the second controller, wherein the matching function result identified by the second comparative module is provided to the third comparative module, wherein the third comparative module utilizes the matching function result from the second comparative module in cooperation with the function result from the first processing unit of the at least third controller to determine whether an error is present in the at least third controller.

6. The control system of claim 5 wherein an error in the second controller results in the second controller failing fail-silent, and wherein the third comparative module utilizes the matching function result from the first comparative module in cooperation with the function result from the first processing unit of the third controller to determine an error in the third controller.

7. The control system of claim 3 wherein each respective controller includes a dual-core processor, wherein each dual-core processor includes a respective first core and a respective second core.

8. The control system of claim 3 wherein each controller includes two single-core processors, wherein each respective core in each controller is a single-core processor.

9. The control system of claim 3 further comprising a communication link coupled between the second comparative module and the third comparative module, wherein the matching function result determined by the second comparative module is communicated from the second comparative module to the third comparative module via the communication link.

10. The control system of claim 1 wherein a number of controllers utilized in the control system is determined by a number of failures the control system is designed to tolerate, wherein the number of controllers is one greater than the number of failures the control system is designed to tolerate.

11. A method of minimizing software backups in a dual-duplex pattern approach, the method comprising the steps of:
executing a function simultaneously in a first processing unit and a second processing unit of a primary controller utilizing an input data from sensing devices, the primary controller controlling features of devices while operating under non-fault operating conditions;
comparing, by a comparative module of the primary controller, a function result from the first processing unit with a function result from the second processing unit to determine whether an error is present in the primary controller;
executing the function in a first processing unit of a second controller utilizing the input data from sensing devices, wherein a second processing unit of the second controller operates in a non-redundant state, the second processing unit not executing the function while in the non-redundant state;
inputting a matching function result identified by the first comparative module to a second comparative module in the second controller;
comparing, by the comparative module of the second controller, the function result from the first processing unit of the second controller with the matching function result from the first comparative module; and
determining, by the second comparative module, whether an error is present in the second controller utilizing only the matching function result identified by the first comparative module and the function result determined by the first processing unit of the second controller; and
designating the second controller as a reconfigured primary controller to control the features of the devices when an error is detected in the primary controller, wherein the first processing unit and the second processing unit of the second controller are each enabled to respectively execute the function utilizing the input data from the sensing devices to generate a respective function result so that the second comparative module may compare the respective function results to determine whether an error is present in the second controller.

12. The method of claim 11 further comprising the steps of:
detecting a fault in the primary controller; and
enabling fail-silent operation of the primary controller.

13. The method of claim 11 further comprising:
providing at least a third controller;
executing the function, by a first processing unit of the at least third controller, utilizing the input data from the sensing devices, with a second processing unit of the at least third controller operating in a non-redundant state, the second processing unit of the at least third controller not executing the function while in the non-redundant state;
inputting a matching function result from the second comparative module to a third comparative module in the at least third controller;
comparing, by the third comparative module, a function result determined by the first processing unit of the at least third controller with the matching function result from the second comparative module;
determining, by the third comparative module, whether an error is present in the at least third controller utilizing only the matching function result identified by the second comparative module and the function result determined by the first processing unit of the at least third controller.

14. The method of claim 13 further comprising the steps of:
detecting a fault in the primary controller; and
failing the primary controller as fail-silent in response to detecting the fault in the primary controller.

15. The method of claim 14 further comprising the steps of:
determining, by the second comparative module, whether the error is
present in the second controller based on the function result from the first processing unit and the second processing unit of the second controller when designated as the reconfigured primary controller;

providing to the third comparative module, a matching function result from the second comparative module when the second controller is designated as the reconfigured primary controller;

comparing, by the third comparative module, the matching function result from the second comparative module designated as the reconfigured primary module with the function result from the first processing unit of the at least third controller to determine whether an error is present in the at least third controller.

16. The method of claim 15 wherein each respective controller includes a dual-core processor, wherein each dual-core processor utilizes a respective first core and a respective second core.

17. The method of claim 15 wherein each controller includes two single-core processors, wherein each respective core in each controller is a single-core processor, and wherein each single core processor executes the function independently utilizing the input data from sensing devices.

18. The method of claim 11 wherein determining a number of controllers to utilize in the control system is determined by a number of failures the control system is designed to tolerate, wherein the number of controllers is one greater than the number of failures the control system is designed to tolerate.

19. A dual-duplex fail-operational control system comprising:

a primary controller including a first processing unit and a second processing unit, the first processing unit and the second processing unit operable to simultaneously execute a function utilizing an input data from sensing devices to generate a respective function result, wherein the primary controller further includes a first comparative module operable to compare the respective function result from the first and second processing units to determine an error in the primary controller;

a second controller including a first processing unit and second processing unit, the first processing unit operable to execute the function, the second processing unit operable to operate in a non-redundant state and not execute the function while in the non-redundant state, wherein the primary controller further includes a second comparative module operable to determine whether an error is present in the second controller;

wherein a matching function result identified by the first comparative module of the primary controller is input to the second comparative module of the second controller to determine whether an error is present in the second controller utilizing only the matching function result identified by the first comparative module and the function result determined by the first processing unit of the second controller; and designating the second controller as a reconfigured primary controller to control the features of the devices when an error is detected in the primary controller, wherein the first processing unit and the second processing unit of the second controller are each enabled to respectively execute the function utilizing the input data from the sensing devices to generate a respective function result so that the second comparative module may compare the respective function results to determine whether an error is present in the second controller.

20. The control system of claim 19 further comprising:

at least a third controller including a first processing unit and a second processing unit, the first processing unit of the at least third controller operable to execute the function, the second processing unit of the at least third controller operable to operate in a non-redundant state and not execute the function while in the non-redundant state, wherein the at least third controller further includes a third comparative module operable to determine whether an error is present in the at least third controller;

wherein a matching function result identified by the second comparative module of the second controller is input to the third comparative module of the at least third controller to determine whether an error is present in the third controller utilizing only the matching function result identified by the second comparative module and the function result determined by the first processing unit of the third controller.

* * * * *